United States Patent [19]

Franklin et al.

[11] Patent Number: 5,650,187

[45] Date of Patent: Jul. 22, 1997

[54] PROCESS FOR MAKING A LOW MEAT PRODUCT

[75] Inventors: Daniel L. Franklin; Richard M. Herreid; Kenneth C. Stephan, all of Austin, Minn.

[73] Assignee: Hormel Foods Corporation, Austin, Minn.

[21] Appl. No.: 570,651

[22] Filed: Dec. 11, 1995

Related U.S. Application Data

[62] Division of Ser. No. 238,910, May 6, 1994, Pat. No. 5,474,790.

[51] Int. Cl.$^6$ .............................. A23L 1/315; A23L 1/317
[52] U.S. Cl. ............................. 426/417; 426/478
[58] Field of Search ..................... 426/646, 417, 426/644, 478; 554/8, 23, 175

[56] References Cited

U.S. PATENT DOCUMENTS

| | | |
|---|---|---|
| 2,745,856 | 5/1956 | Dayen et al. . |
| 2,911,421 | 11/1959 | Greenfield . |
| 3,008,831 | 11/1961 | Christianson . |
| 3,063,840 | 12/1962 | Sullivan . |
| 3,078,287 | 2/1963 | Downing . |
| 3,141,774 | 7/1964 | Little . |
| 3,177,080 | 4/1965 | Alberts . |
| 3,270,041 | 8/1966 | Artar et al. . |
| 3,295,982 | 1/1967 | Hickey et al. . |
| 3,449,315 | 6/1969 | Aikins . |
| 3,539,549 | 11/1970 | Greenfield . |
| 3,780,075 | 12/1973 | Dufault et al. . |
| 3,780,191 | 12/1973 | Langer . |
| 3,938,072 | 2/1976 | Baird et al. . |
| 4,137,335 | 1/1979 | Holm et al. . |
| 4,163,009 | 7/1979 | Filstrup . |
| 4,168,418 | 9/1979 | Bird . |
| 4,201,302 | 5/1980 | Roth . |
| 4,335,846 | 6/1982 | Shapiro . |
| 4,567,050 | 1/1986 | Roth . |
| 4,619,789 | 10/1986 | Strop et al. . |
| 4,747,342 | 5/1988 | Schack et al. . |
| 4,764,163 | 8/1988 | Caldwell . |
| 4,778,682 | 10/1988 | Chapman . |
| 4,966,733 | 10/1990 | Fernando et al. . |
| 4,980,185 | 12/1990 | Small . |
| 5,092,528 | 3/1992 | Rudibaugh . |
| 5,167,977 | 12/1992 | Gamay . |
| 5,221,554 | 6/1993 | Gamay . |
| 5,382,444 | 1/1995 | Roehrig et al. . |
| 5,552,173 | 9/1996 | Singh et al. ............... 426/417 |

FOREIGN PATENT DOCUMENTS

| | | |
|---|---|---|
| 948651 | 2/1964 | United Kingdom . |
| 974154 | 11/1964 | United Kingdom . |
| 1046642 | 10/1966 | United Kingdom . |
| 2244999 | 12/1991 | United Kingdom . |
| PCT/US95/01971 | 2/1995 | WIPO . |

OTHER PUBLICATIONS

P.L. Dawson, B.W. Sheldon, and H.R. Ball, Jr., "Extraction of Lipid and Pigment Components from Mechanically Deboned Chicken Meat", vol. 53 No. 6, 1988 – Journal of Food Science, pp. 1615–1617.

G.W. Froning and Faye Johnson, "Improving the Quality of Mechanically Deboned Fowl Meat by Centrifugation", vol. 38, 1973, Journal of Food Science, pp. 279–281.

Article entitled "The Trim-B Process—The Development of Continuous Low Temperature Rendering"(Circa 1950's).

*Primary Examiner*—Arthur L. Corbin
*Attorney, Agent, or Firm*—Merchant, Gould, Smith, Edell, Welter & Schmidt, P.A.

[57] ABSTRACT

A process for making a low fat meat product includes grinding meat having less than 50% fat to reduce the meat to a small particle size. The meat is then heated to a target temperature less than 100° F., which is hot enough to melt the fat and low enough not to denature the meat. The meat is then placed in a centrifuge and subject to centrifugal separation, thereby making a low fat meat product and an oil product. The low fat meat is removed from the centrifuge and chilled and the oil product is removed and may later be subject to a polishing operation. In addition, the process may include mixing the meat after it has been heated and before being placed into the centrifuge.

14 Claims, 3 Drawing Sheets

PROCESS FOR MAKING A LOW MEAT PRODUCT

This is a divisional of application Ser. No. 08/238,910, filed May 6 1994, U.S. Pat. No. 5,474,790, which patent is incorporated herein by reference.

BACKGROUND OF THE INVENTION

1. Field of the Invention

This invention relates generally to the process of the removal of fat from meat and more particularly, a continuous process for the removal of fat from ground meat at a low temperature using a centrifuge without changing the characteristics of the meat protein.

2. Description of Prior Art

The production of low fat foods has become increasingly important in recent years as the negative health effects of excess fat consumption have become widely known. In order for a low fat food to become commercially successful, it must satisfy the flavor, appearance, and texture expectations of the consumer at a price that is not out of line with the cost of analogous full fat foods. Processed meats and foods containing significant amounts of meat are among the most difficult types of foods to make with low fat levels that meet consumer expectations at a reasonable cost.

Most recently the United States Food and Drug Administration and Department of Agriculture have tightened the requirements for reduced fat foods. These changes have resulted in requiring lean meat to have less than 10% fat and extra lean meats to have less than 5% fat. Low fat foods are defined as containing less than 3 grams of fat per serving or less than 3 grams of fat per 100 grams of food if the serving size is less than 100 grams. These new requirements have made it even more difficult to produce "lean", "extra lean", or "low fat" meat products which meet consumer expectations in an economical manner.

The most common meats used to make low fat products are trimmed whole muscle cuts such as ham meat, skinless chicken breast meat, skinless turkey breast meat, etc. While these lean meats have good acceptance in the marketplace, they are very expensive. The use of trimmed whole muscle meats in processed meat products such as sausage or meat containing foods such as chili or stew make the low fat products much more expensive than the traditional full fat products which use meat or poultry trimmings as ingredients.

Many processes have been proposed to remove fat from meat trimmings. These processes have been unsuccessful in producing low fat meats either because the meats were inherently poor in protein quality or because the processes altered the original functionality of the meat. In either case the resulting reduced fat meats were inferior ingredients in processed meats or food products. These processes have generally taken the following approaches to removing fat from meat or poultry trimmings.

One approach has been to wash the finely divided meat with a solution of water and/or additives such as acids to remove fat and soluble proteins from coagulated proteins. The coagulated meat proteins are then used as ingredients in food products. These processes not only remove fat, but also proteins that give meat its characteristic color and flavor. These changes in composition produce a reduced fat "meat" that is significantly different than the initial lean meat fraction and suffer losses in yield that increase the cost of the finished product. Examples of this type of process are U.S. Pat. Nos. 5,167,977 and 5,221,554 as well as a report in the Journal of Food Science volume 53, no. 6, pp. 1615–1617 (1988).

Another approach has been to recover fat using low temperature rendering processes. These processes involve recovering fat from animal fatty tissues at temperatures of 90°–120° F. The resulting reduced fat protein fraction is claimed to be used as a minor component in making processed meat products. This reduced fat protein fraction typically contains a high level of collagen which gives it poor binding properties for processed meats such as sausages. Examples of this approach are given in U.S. Pat. Nos. 3,270,041 and 3,449,315.

Another approach to reducing fat in meat is to centrifuge the mechanically deboned chicken at high speed to produce a fat fraction, an aqueous protein solution and a protein precipitate, each fraction comprising about one third of the original starting weight. This process results in a significant loss of product as the yield is only about 33% of the starting weight when the original material contained about 15–20% fat. This approach is described in the Journal of Food Science volume 38 pp. 279–281 (1973).

The process of this invention addresses the problems associated with the prior art and produces low fat meats which maintain the color, flavor, and functionality of the original meat. The low fat meats produced with this invention can be used to make a variety of processed meat products and can be used as the sole meat ingredient in other low fat foods.

SUMMARY OF THE INVENTION

The present invention is a process for making a low fat meat product. The process includes grinding meat, having less than 50% fat, to reduce the meat to a small particle size. The fat in the meat has a melting temperature. The meat is then heated to a target temperature of less than 100° F. which is high enough to melt the fat and low enough not to denature the meat. The meat is then placed in a centrifuge and subjected to centrifical separation forces, thereby making a low fat meat product and an oil product. The low fat meat product is then removed from the centrifuge. In a preferred embodiment, the meat has from 5–30% fat and further the process includes mixing the meat after heating and before placing the meat into the centrifuge. Further, the process includes using a continuous decanter-type centrifuge and having the pond depth of the centrifuge set from 80–110% of the distance from a solid discharge opening to an internal centrifuge bowl outer diameter.

In another embodiment, the invention is a process for removing fat from meat including grinding the meat to reduce the meat to a small particle size. The meat has fat and the fat has a melting temperature. The meat is then heated to a target temperature of less than 100° F. which is high enough to melt the fat and low enough not to denature the meat. The meat is then placed in a centrifuge and subjected to a centrifical separation thereby making a low fat meat product and an oil product. The meat is then removed from the centrifuge and the oil is also removed from the centrifuge. In a preferred embodiment, the process also further comprises mixing the meat after heating and before placing the meat into the centrifuge.

DETAILED DESCRIPTION OF THE PREFERRED EMBODIMENT

Figure 3:
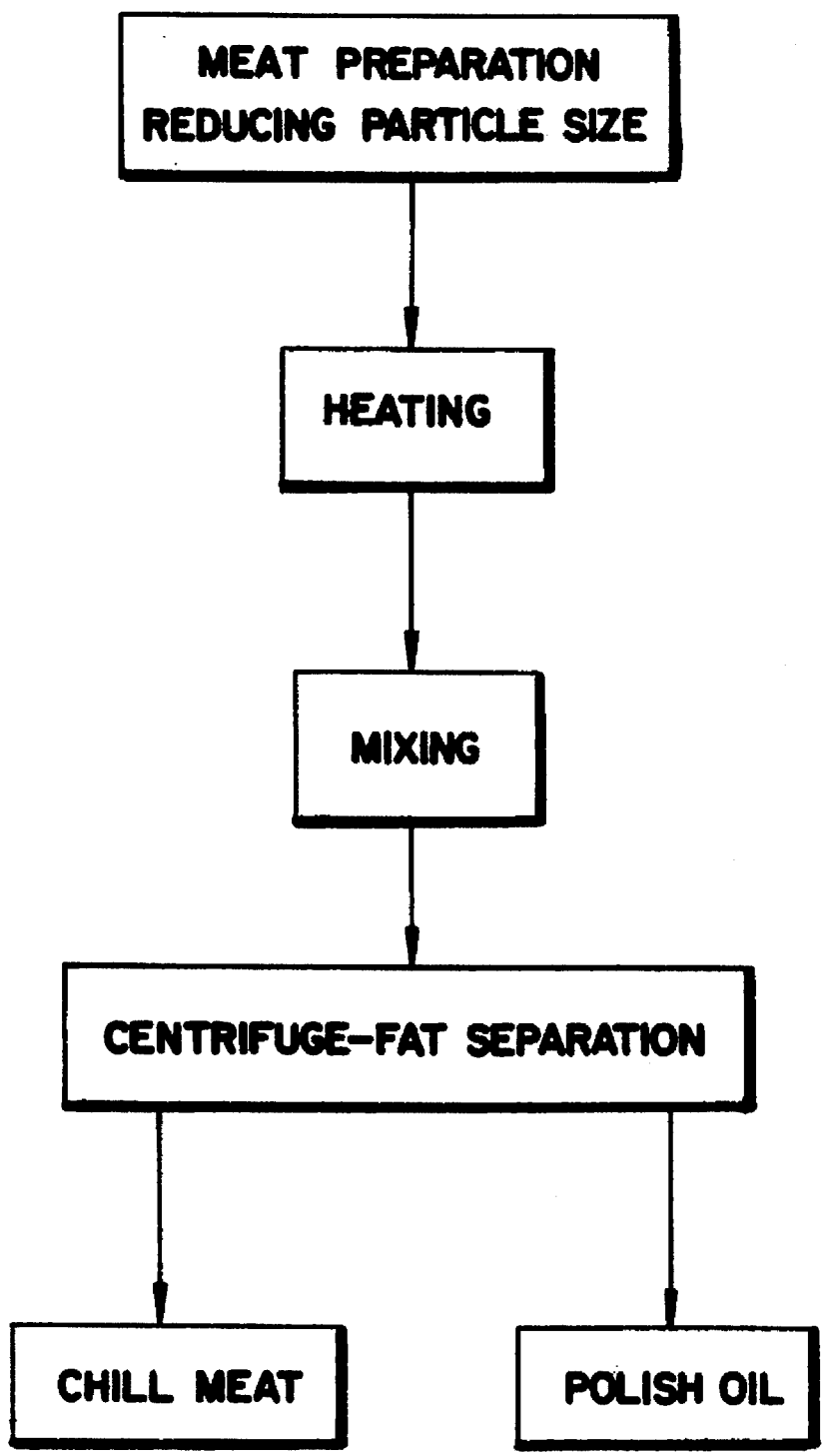
FIG. 3 is a flow chart of the process used in our present invention.

Referring to the drawing, wherein like numerals represent like parts throughout the several views, there is generally shown in FIG. 3 the preferred embodiment for the process of this invention. Generally, the process involves preparation of a meat product, heating the meat to a temperature, mixing the meat, subjecting the meat to a centrifuge force, removing the meat and the oil and finally chilling the low fat meat.

Raw Materials

The United States Food and Drug Administration's definition of meat does not include poultry. However, as the term "meat" is used in this application meat does include poultry, fish and seafood, and would therefore include beef, lamb, pork, chicken, turkey, fish and seafood. Further, reference to "turkey meat" or "chicken meat" is not limited to the definition as used by the U.S.D.A., but is broadly defined to include all parts of a chicken or turkey. The meat is first reduced to a small particle size through either chopping, as a result of passing the meat through a screen with fine openings such as a Beehive mechanical deboning machine, or other suitable means well known in the art. It has been found that the smaller the meat particle size, the better the fat removal with this process. However, even meat which has been only placed through a one-eighth inch opening will have some fat removed by use of this process. However, applicants have found that if the meat is reduced to a particle size of equal to or less than 0.06 inches the process is more beneficial. Still more preferable is if the particle size is between 0.010 and 0.020 inches in diameter.

The meat which is typically used has between 5–30% fat. However, this process would be applicable to meat having up to 50% fat. This is in contrast to a typical fat rendering process where the meat product would typically have an excess of 80% fat. Mechanically deboned meat is thought to be the major source of meat for this process and it has a fat content from 10 to 25%.

Either fresh or frozen meat particle sizes may be used. Preferably, the meat is used within two hours of particle size reduction or removal from the bone and optimally, the meat should be used within six hours post-mortem. However, it is understood that meat that is not this fresh may also be used. The temperature of the meat entering this process may have a wide variety and applicants have successfully run meats having temperatures from 28° F. to 55° F.

Heating the Meat

The meat is then gently heated to just over the melting point of the fat in the meat. Therefore, the type of meat being used will determine the target temperature to which the meat is raised. For turkey and chicken, the target temperature is between the temperatures of 85°–90° F., with the melting point of the fat in chicken and turkey to be approximately 80° F. For pork, the target temperature is 93°–98° F. as the melting point of fat in pork is approximately 90°. Similarly, for the other meats, the target temperature to which the meat is heated would be similarly over the melting point of the meat's fat. There is an optimum temperature range of the raw material to get good fat removal while retaining the functionality of the meat protein. Heating the meat to more than 10° F. above the fat melting point causes a reduction in the fat removal until the temperature is further increased to more than 30° F. above the fat melting point. However, as the meat is heated significantly over 100° F., the functionality of the protein decreases because of denaturation.

The heating of the meat may be done by any suitable means such as in jacketed kettles with an agitator or agitators or by pumping the meat through heat exchangers. Although heating in a kettle may work, there would be problems with bacterial growth and localized areas of over heating in a commercial process because all of the meat is held at the target temperature for a considerable period of time. Applicants have found that the best heating method was to use a scraped surface heat exchanger. In such equipment, the meat is pumped through the heat exchanger continuously so that there is a short residence time at the target temperature. The scraped surface heat exchanger is efficient so that the water in the heating jacket is usually only 5°–15° F. above the target temperature which avoids local overheating of the meat. When a heat exchanger which has an inlet and outlet to the heating jacket was utilized, applicants have found that it is optimal to have less than a 1°–2° F. difference between the water entering the inlet and the water existing the outlet for optimal results. With the use of a scraped surface heat exchanger, heating of the meat from the water in the heating jacket is augmented by the mechanical equivalent of heat that is supplied by the turning of the rotors. As previously discussed, the target temperature is the temperature at which the meat will enter the centrifuge. However, as will be discussed more fully hereafter, if a mixing step is utilized, there may be two temperatures to which the meat may be heated. The first is the target temperature and the second is a mixing temperature which increases when the meat is completely mixed and is then equal to the target temperature. Examples of suitable heat exchangers are Contherm 6x3, 6x6 or 6x9 heat exchangers from Alpha Laval, Newberry Port, Mass.

It is understood that heating of the meat has been described without mixing being discussed. Applicants have found that by mixing the meat while heating, improved efficiency of heating occurs and there is better heat transfer, with better overall heating if agitation also takes place while the meat is being heated.

Mixing of the Meat

While not essential to the low fat meat process, applicants have found that fat separation from the meat was significantly improved if the meat was mixed after heating but before going into the centrifuge. The mixing may be accomplished by any number of post-heating mixers such as ribbon blenders, static mixers or simply additional scraped surface heat exchanger with no water flowing through the heating jacket for heating. Cooling water may be added to those mixers to control the final product temperature. The heated meat is pumped through to the mixer. The amount of mixing will depend upon the type of mixer utilized. The effect of the mixing is to change the meat from a relatively smooth appearance to an appearance wherein the fat has started to separate and the meat mixture has a more curdled (like cottage cheese) look.

If the meat entering the mixing step has already reached the target temperature, it would be necessary to cool the meat during mixing as the action of the mixer will raise the temperature of the meat being mixed. Alternatively, the meat may enter the mixing process at a temperature which is less than the target temperature. This mixing temperature could be from 1°–10° F. less than that of the target temperature. In such a mixing process, the mixer would be insulated and the action of the mixing would bring the meat up from the mixing temperature to the target temperature. Again, the purpose of the mixing process is to bring about the initial separation of the fat from the meat with sufficient mixing to accomplish this task. The mixer is preferably a continuous-type mixer for optimum use in a commercial process. The meat is then pumped to the centrifuge.

Fat Separation By Use of a Centrifuge

Figure 1:
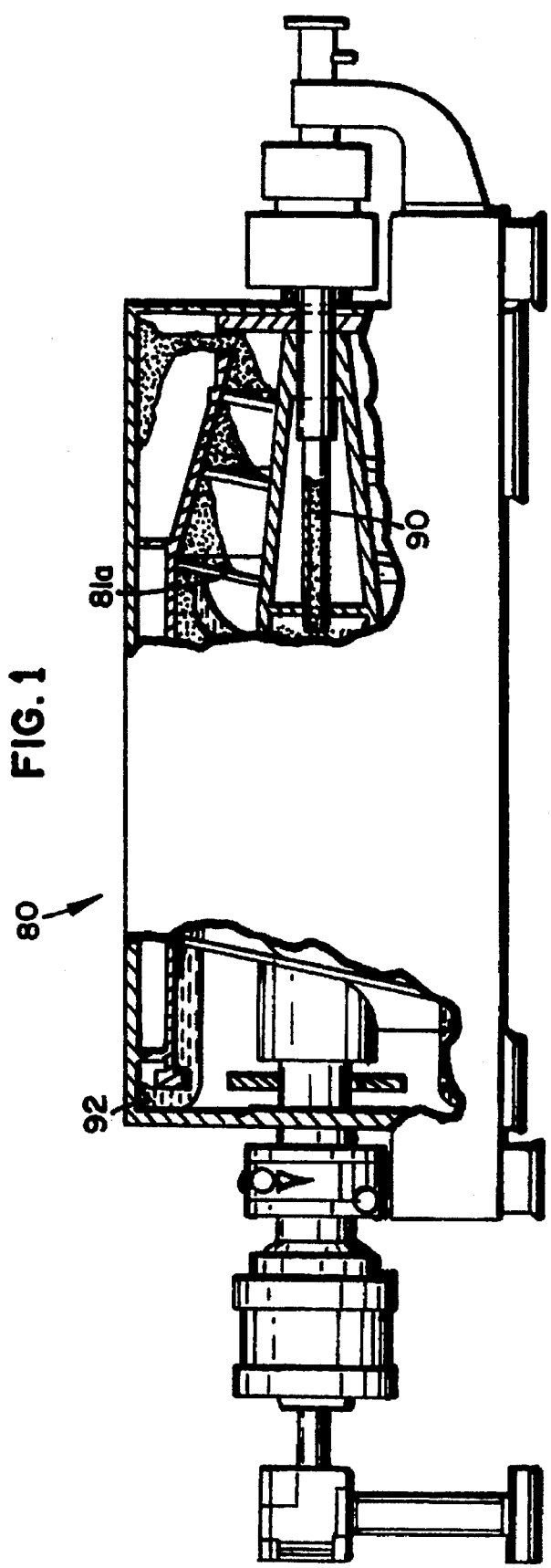
FIG. 1 is a side elevational view of a bowl-type centrifuge used in this process.
Figure 2:
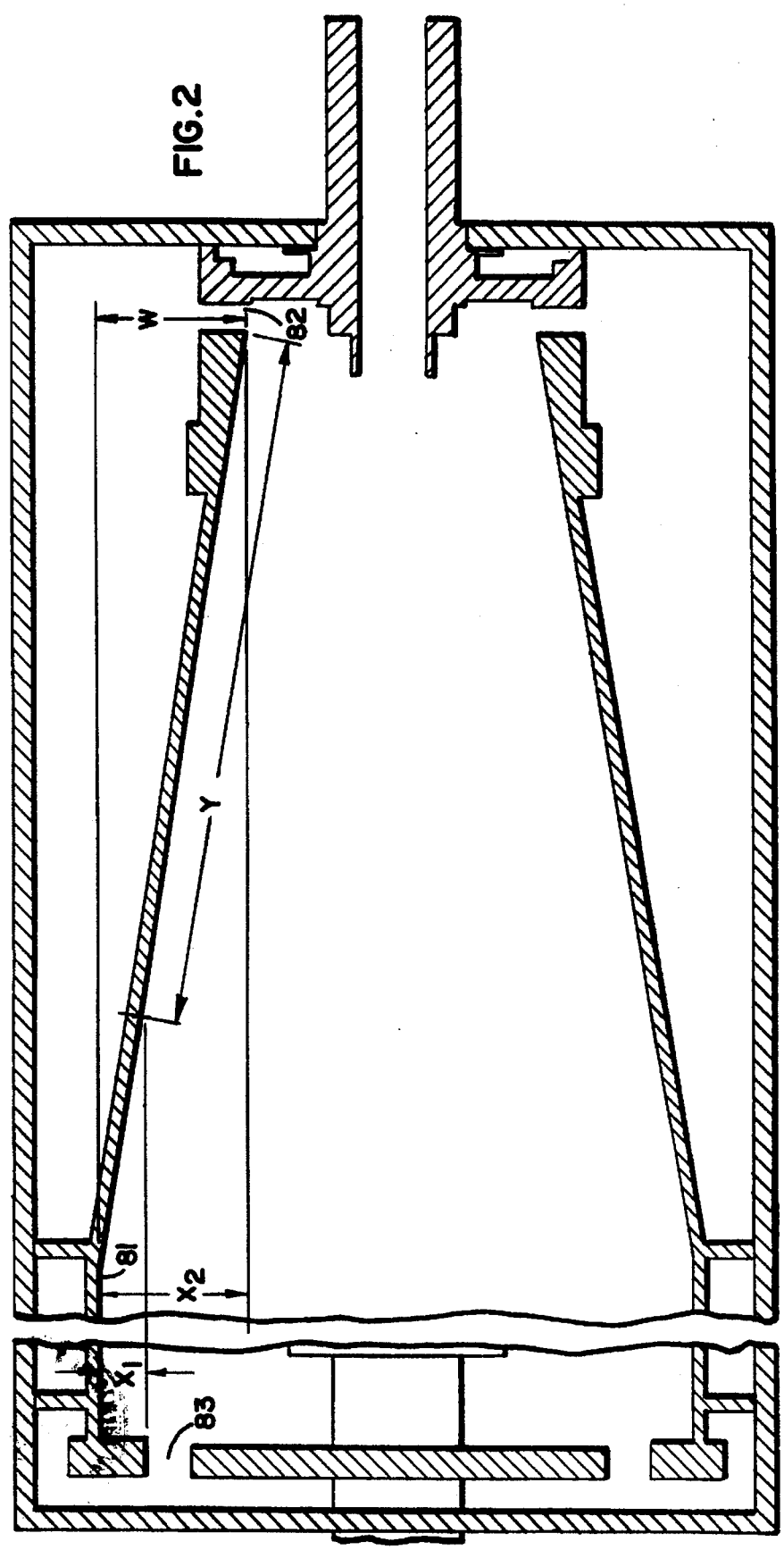
FIG. 2 is a cross sectional view of the centrifuge of FIG. 1.

The fat separation is done by pumping the meat through a continuous decanter-type centrifuge such as a Sharples Super-D-Canter made by Pennwalt Corporation, Warminster, Pa. Two suitable models are the P-1000 and P-3400. However it is understood that other models and other types of centrifuges may be utilized. Referring to FIGS. 1 and 2, the centrifuge, generally designated as 80, will be described only in general terms as the centrifuge is well known in the art. The ground meat particles 90 are pumped to the center of the centrifuge 80. Then, by centrifugal force, the meat particles are forced to the outside surface of the centrifuge bowl 81. An auger 81a brings the ground meat particles forward and the edible lean meat product 91 exits the solid discharge opening 82. The oil liquid 92 exits the liquid discharge opening 83.

There are several centrifuge parameters that can be varied that have an influence on the amount of fat separation for a particular meat. The first is bowl speed. The bowl speed determines the separation force applied to separate fat. The faster the bowl speed, the higher the centrifugal force applied to the meat and the better the fat separation. Generally the force generated should be at least 200 times the force of gravity and preferably at least 1700 times the force of gravity.

The second variable is differential speed. The differential speed refers to the difference in speed between the centrifuge bowl and the auger that moves the solids out of the centrifuge. The differential speed has to be balanced with the meat flow rate through the centrifuge and the bowl speed to get the optimum fat separation. Generally there should be a differential of from 2 to 30 RPM and preferably 10 to 20 RPM.

The third variable is pond depth. The liquid discharge end of the centrifuge bowl has plate dams that control the level of liquid phase material in the bowl. The best fat separation takes place when pond depth is set as deep as possible so that there is little or no beach area at the solid discharge end of the bowl. This is contrary to the conventional instructions for centrifuge operations which indicate that the maximum liquid removal (fat in this case) is achieved with a minimum pond depth. As previously stated, the pond depth will depend upon the geometry of the bowl and adjustment of the plate dams. As shown in FIG. 2, the pond depth is set quite low and is not recommended, but is shown for illustrative purposes. The pond depth is shown by the reference dimension $X_1$ and represents the distance from the internal centrifuge bowl's outer diameter to the opening in the plate dam. Each centrifuge has a distance W which is the distance from the solid discharge opening to the internal centrifuge bowl's outer diameter. This establishes the beach length Y. However, for the operation of the present invention, applicants have found that the pond depth should be increased. Accordingly, the plate dams would be adjusted such that the openings in the plate dams are closer to the centerline of the centrifuge. FIG. 2 also shows a second pond depth $X_2$ which would represent the pond depth if the plate dams were adjusted for a larger pond depth. This pond depth $X_2$ in turn would decrease the beach length to zero. Applicants have found that it is best if the pond depth is 80–110% of the distance W, however, depending on the centrifuge, it may go above 110%.

Chilling

After the low fat meat 91 is thrown out of the centrifuge, it is preferably cooled if it is not used immediately. It may be cooled by any number of methods such as being pumped from the centrifuge through a cooled scraped surface heat exchanger to rapidly reduce the meat temperature to less than 35° F. to minimize spoilage. Rapid chilling is also effective in maintaining the functionality of the meat. Although continued chilling with a heat exchanger is not absolutely necessary, it produces the best quality product in the commercial process. Applicants have chilled the meat by placing it on pans and by placing it in a blast freezer to chill the meat to less than 40° F. in about an hour. However, as previously stated, the continuous chilling is preferred.

Oil Separation

After the oil 92 is thrown out of the centrifuge it is collected and pumped to a storage location. The oil can be used directly for edible applications or may be further processed to meet special requirements. The further processing may be placing the oil through another centrifuge to polish the oil, thereby making a further refined product out of the oil. Such a polishing operation is well known in the art.

EXAMPLES

Applicants have been very successful in producing a low fat meat product by use of the present invention. The following are examples of the use of the process and the results.

EXAMPLE 1

Mechanically deboned turkey (MDT) prepared from turkey frames with a Beehive deboning machine was pumped into a Doering feed pump hopper. The MDT was pumped at a rate of 2,400 lbs per hour through three Contherm 6×9 scraped surface heat exchangers arranged in series with the following settings:

| Heat Exchanger | Rotor Diameter | Blade Configuration | Rotor Speed |
| --- | --- | --- | --- |
| #1 | 4.5" | Staggered | 250 RPM |
| #2 | 3.0" | Staggered | 250 RPM |
| #3 | 3.0" | Staggered | 250 RPM |

Other examples have used rotor speed of up to 350 rpm.

Warm water was circulated through the heating jacket of heat exchangers #1 and #2, but no water was circulated through the heating jacket of heat exchanger #3. As the MDT came out of the third heat exchanger it had reached a temperature of 86°–88° F.

The MDT was piped directly into the feed tube of a Sharples Super-D-Canter P-3400 centrifuge running at 3,000 RPM with plate dam settings of 4.9 and a differential of 20 RPM. The low fat MDT coming out of the solids discharge of the centrifuge was pumped through three additional Contherm 6×9 scraped surface heat exchangers in series with ammonia circulating through the cooling jackets.

| Heat Exchanger | Rotor Diameter | Blade Configuration | Rotor Speed |
| --- | --- | --- | --- |
| #4 | 3.0" | Staggered | 200 RPM |
| #5 | 4.5" | Staggered | 200 RPM |
| #6 | 4.5" | Staggered | 200 RPM |

The low fat MDT coming out of these heat exchangers was at 30°–32° F. The process required less than thirty minutes from the time the MDT was removed from the turkey bones until the fat was removed and the temperature was brought down to 30°–32° F. The composition of the MDT before and after fat removal are as follows:

|  | Mechanically Deboned Turkey Out of Beehive Deboner | After Low Fat Process |
| --- | --- | --- |
| Protein | 14.0% | 16.6% |
| Moisture | 66.2% | 79.4% |
| Fat | 18.4% | 2.6% |

Example 2

Fresh mechanically deboned chicken (MDC) was pumped through four Contherm scraped surface heat exchangers and then through a Sharples Super-D-Canter P-3400 with a Handtmann meat pump. The MDC was pumped at a rate of 900 lbs/hr and heated to 88° F. using the following heat exchanger settings:

| Heat Exchanger | Size | Rotor Diameter | Blade Configuration | Speed |
| --- | --- | --- | --- | --- |
| #1 | 6 × 3 | 4.5" | Straight | 150 RPM |
| #2 | 6 × 3 | 4.5" | Straight | 150 RPM |
| #3 | 6 × 6 | 3.0" | Straight | 150 RPM |
| #4 | 6 × 6 | 3.0" | Straight | 150 RPM |

Warm water was pumped through the heating jackets of heat exchangers #1 and #2 to heat the MDC to 88° F. before it went into the centrifuge. No water was pumped through the heating jackets of heat exchangers #3 and #4. The centrifuge was operated at 3995 RPM with plate dam settings of 4.9 and differential of 9.9 RPM. The composition of the MDC changed as follows after going through the process.

|  | Mechanically Deboned Chicken | After Low Fat Process |
| --- | --- | --- |
| Protein | 14.3% | 16.3% |
| Moisture | 69.1% | 76.8% |
| Fat | 15.3% | 5.6% |

The low fat mechanically deboned chicken was collected on shallow pans and chilled in a blast freezer to less than 40° F. in 60–90 minutes. The chilled, low fat mechanically deboned chicken was then used as an ingredient in a low fat luncheon meat.

Example 3

Mechanically separated pork (MSP) was used in the same described in Example 2 for mechanically deboned chicken. The MSP was pumped through the system at 630 lbs/hr. The MSP was heated to 96° F. before going into the centrifuge. The composition of the MSP was changed as follows:

|  | Mechanically Separated Pork | After Low Fat Process |
| --- | --- | --- |
| Protein | 16.3% | 18.4% |
| Moisture | 65.9% | 74.3% |
| Fat | 17.1% | 6.4% |

Example 4

Coarse ground turkey neck meat and wing meat were recovered with a Poss meat recovery system with plate openings of 2 mm. These turkey meats were processed to remove fat in the same process described above for Example 3. The equipment settings were set as follows for these meats:

|  | Turkey Wing Meat | Turkey Meat |
| --- | --- | --- |
| Meat Flow Rate | 540 lbs/hr | 600 lbs/hr |
| Heat Exchangers |  |  |
| #1 and #2 Rotors | Warm water in jackets for both meats 4.5" diameter rotors with straight blades 150 RPM speed for both meats |  |
| #3 and #4 Rotors | No water circulated in jackets 3" diameter rotors with straight blades |  |
|  | 150 RPM | 75 RPM |
| Meat Temperature to centrifuge | 89–91° F. | 84–88° F. |
| P-3400 Centrifuge |  |  |
| Speed | 3990 RPM | 3992 RPM |
| Plate Dams | 4.8 | 4.8 |
| Differential | 14.7 RPM | 4.4 RPM |
| Initial Meat Composition |  |  |
| Protein | 17.7% | 16.9% |
| Moisture | 65.7% | 75.1% |
| Fat | 16.3% | 6.0% |
| Low Fat Meat Composition |  |  |
| Protein | 22.0% | 17.9% |
| Moisture | 74.3% | 77.1% |
| Fat | 3.1% | 3.7% |

Example 5

Two tests were run specifically to look at the effect of temperature on the efficiency of fat removal from mechanically deboned turkey. The equipment used was the Handtmann meat pump, two 6×3 Contherm scraped surface heat exchangers, and the Sharples Super-D-Canter P-1000 centrifuge. Chilled mechanically deboned turkey (MDT) was pumped through the system at the rate of 360 lbs/hr. Warm water was pumped through the Jacket of the first heat exchanger. No water was pumped through the jacket of the second heat exchanger. Both heat exchangers used 4.5" diameter rotors with straight blade configurations and ran at 175 RPM. The centrifuge ran at 3250 RPM with a differential of 10 RPM and the 701 plate dams set at maximum pond depth (position 5–0).

The meat temperature going to the centrifuge was raised in steps and meat was collected out of the centrifuge for fat analysis. Some of the meat at several temperatures was also chilled in pans in a blast freezer (less than 40° F. in 90 minutes) for making franks to test the protein functionality at varying temperatures. Protein functionality was tested by measuring the firmness of the finished franks with an Instron instrument. Franks were made with the addition of turkey fat to the low fat MDT to bring the fat content back to the level of the MDT control, although the product can be used without the addition of fat in a commercial frank. This was done to reduce differences in the finished bind or texture due to differences in composition. The Instron penetration force values were divided by the protein content and expressed as a percent of the values for the control franks made from the initial MDT before any heating.

Results of these tests shown below indicate that there is an optimum temperature for turkey fat removal from MDT in the 85°–90° F. range. This is the temperature for greatest fat removal while maintaining the maximum protein functionality.

| Temperature into Centrifuge (°F.) | Fat Content of MDT Out of Centrifuge | Firmness of Franks (% of Control) |
| --- | --- | --- |
| 40 (Control before Centrifuge) | 16.0% | 100% |
| 77 | 9.6% | 94% |
| 86 | 4.4% | 110% |
| 93 | 5.3% | 94% |
| 97 | 8.1% | 93% |
| 105 | 6.7% | 84% |
| 109 | 4.6% | — |
| 115 | 4.2% | 68% |
| 119 | 3.2% | — |

Example 6

This example is to show the effect of centrifuge speed on fat removal. Fresh mechanically deboned turkey (MDT) was heated in a water jacketed ribbon blender to 85° F. An IEC clinical centrifuge was used to separate fat in 50 ml centrifuge tubes at different centrifuge speeds. The MDT was centrifuged for two minutes and the fat decanted from the meat. The results showed the expected effect of centrifugal force on fat separation. At each of these speeds, there was no aqueous phase separated from the MDT.

| Centrifuge | | % Fat in MDT |
| --- | --- | --- |
| Speed | Force | (initial MDT 19.7%) |
| 900 RPM | 92 × g | 11.9% |
| 1,250 RPM | 178 × g | 10.7% |
| 1,750 RPM | 348 × g | 9.7% |
| 2,100 RPM | 501 × g | 8.6% |
| 2,650 RPM | 798 × g | 6.3% |

Although increasing the centrifugal force increased the fat separation above, a point is reached where meat juice is separated as well as fat from the MDT. In another test, MDT was heated to 86° F. and centrifuged for five minutes in a Sorval RC2 centrifuge.

| | | Centrifuged MDT | |
| --- | --- | --- | --- |
| Centrifuge Force | Supernatant Composition | % Fat | % Protein Lost (initial 14.0%) |
| 500 × g | Fat only | 11.1% | 0% |
| 2,500 × g | Fat/Aqueous Layers | 8.6% | 9% |

Using a continuous centrifuge with the procedure in Example 2 above, we got the following results with MDT at 86° F. and 1,500 lbs/hr flow rate. There was no meat juice separation at either of these speeds.

| Centrifuge | | % Fat in MDT |
| --- | --- | --- |
| Speed | Force | (initial MDT 19.7%) |
| 3250 RPM | 2,100 × g | 5.5% |
| 3992 RPM | 3,170 × g | 5.0% |

Example 7

This example shows the effect of centrifuge differential on fat separation. Process of example 2 above was used with fresh mechanically deboned turkey using a flow rate of 1,500 lbs/hr and a temperature of 86° F. going into the centrifuge.

| Centrifuge | | MDT out of Centrifuge |
| --- | --- | --- |
| Bowl Speed | Differential | (initial Fat 14.7%) |
| 3992 RPM | 4.4 RPM | 3.8% |
| 3992 RPM | 7.4 RPM | 3.7% |
| 3992 RPM | 9.9 RPM | 3.1% |

In another test the equipment and process of Example 1 above used with MDT at a flow rate of 2,400 lbs/hr.

| Centrifuge | | MDT out of Centrifuge |
| --- | --- | --- |
| Bowl Speed | Differential | (initial Fat 14.7%) |
| 2,800 RPM | 10 RPM | 5.4% |
| 2,800 RPM | 15 RPM | 3.2% |
| 2,600 RPM | 15 RPM | 3.7% |
| 2,600 RPM | 17 RPM | 5.9% |

Example 8

This example shows the effect of pond depth changes on the process. Both the Sharples P-1000 and the P-3400 centrifuges have adjustable plate dams which raise and lower the pond depth in the centrifuge. In the P-3400 the pond depth can be adjusted with the universal plate dams from 1.1" less than the solids discharge opening to 0.25" above the solids discharge opening. To achieve this range of adjustment with the standard plate dams on the P-1000, the dam openings had to be partially blocked off, leaving a ¼" opening. The 701 dam allows the pond depth in the P-1000 to be adjusted from 3" less than the solids discharge level to 0.1875" above the solids discharge level. With these plate dams, tests were run on both centrifuges as follows.

The P-1000 centrifuge was tested with MDT using the basic procedure of Example 5 above. The plate dams have five positions on this centrifuge ranging from 5–0 (deepest pond) to 1–0 (shallowest pond). The P-1000 was tested with MDT at 86°–87° F. with the following results:

| Dam Setting | 5-0 | 4-0 | 3-0 |
|---|---|---|---|
| Pond Depth | 3.3125" | 2.4375" | 1.5625" |
| Pond Distance from solids discharge | −0.1875" (pond above solids discharge) | 0.6875" | 1.5625" |
| Results from solids and liquids discharge ports at flow of 6–7 lbs/min. | | | |
| Solids: | Meat at 4–5% fat | nothing | nothing |
| Liquid: | Clear fat | meat | meat |
| Results from solids and liquid discharge ports at flow of 3–4 lbs/min. | | | |
| Solids: | — | 1 lb/min meat at 6% fat | — |
| Liquid: | — | 2.4 lbs/min meat at 25% fat | — |

The P-3400 centrifuge was tested with MDT using the basic procedure of Example 2 above. The plate dams can be adjusted from 1.0 to 6.0 settings with higher the number, the deeper the pond depth. The P-3400 was tested with MDT at 86°–88° F. at various pond depths as follows:

| Dam Setting | 5.6 | 4.8–4.9 | 4.3 |
|---|---|---|---|
| Pond Depth | 2.02" | 1.86" | 1.66" |
| Pond Distance from solids discharge | −0.193" (pond above solids discharge) | 0.03" | 1.168" |
| Results from solids and liquids discharge ports at flow of 16–17 lbs/min. | | | |
| Solids: | nothing | meat | meat |
| Liquid: | meat | clear fat | clear fat |

Example 9

This example shows the effect of mixing on fat separation. Mechanically deboned turkey (MDT) was pumped through a scraped surface heat exchanger to raise the temperature to 87° F. It was then mixed in a ribbon blender without further heating, samples of MDT after various times of mixing were centrifuged in an IEC clinical centrifuge at 2650 RPM for 2 minutes in 50 ml centrifuge tubes. The fat was decanted and weighed.

| Mixing time in ribbon blender at 87° F. | % Fat Separated (based on initial MDT weight) |
|---|---|
| 0 mins | 1.6% |
| 5 mins | 10.5% |
| 10 mins | 13.2% |
| 15 mins | 13.9% |
| 20 mins | 14.3% |
| 25 mins | 14.0% |

A further example of the effect of mixing on the efficiency of fat separation was shown when MDT was processed using the equipment as set up in Example 2 above. In one test the MDT (19.7% fat) was heated in two 6×3 Contherm heat exchangers and then pumped directly into the Sharples P-3400 centrifuge without a mixing step. The average fat content of the MDT out of the centrifuge was 8.6%.

In another test the MDT (18.2% fat) was heated in the two Contherm 6×3 heat exchangers and then mixed in two Contherm 6×6 heat exchangers before being pumped into the centrifuge. The average fat level of the MDT out of the centrifuge was 4.0%.

Example 10

The example shows the effect of meat freshness on fat separation efficiency. Mechanically deboned turkey (MDT) was processed using the procedure of Example 1 above after holding the MDT for different lengths of time post-mortem. Holding the processing conditions constant, the shorter the holding time prior to heating the meat, the lower the fat level in the centrifuged meat.

| MDT Conditions | Average Fat |
|---|---|
| Direct from Beehive deboner | 2.5% |
| Held 5 hrs Out Of Beehive deboner | 3.6% |
| Held about 20 hrs Out of Beehive deboner | 5.4% |

The present invention allows for the retention of meat protein functionality for use in food products. The low fat meat product may be used as the primary or sole ingredient in a meat product. The fat is removed from the meat without altering the composition or characteristics of the lean meat. There is no loss in storage life for the low fat meat as compared to the original meat in fresh or frozen storage.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

We claim:

1. A process for making a low fat poultry meat product comprising:
   (a) grinding poultry meat having less than 50% fat to reduce the poultry meat to a small particle size, the fat having a melting temperature;
   (b) heating the poultry meat to a target temperature of about 85° to 90° F. which is high enough to melt the fat and low enough not to denature the poultry meat;
   (c) placing the poultry meat into a centrifuge and subjecting the poultry meat to centrifugal separation thereby making a low fat poultry meat product and an oil product, wherein centrifugal separation is carried out in a continuous decanter-type centrifuge having a centrifuge bowl, screw conveyor, pond depth, and solids discharge opening, and wherein the centrifuge has a pond depth which is 80% to 110% of the distance from the solids discharge opening to the internal centrifuge bowl's outer diameter; and
   (d) removing the low fat poultry meat product from the centrifuge, the low fat poultry meat produce having 9.7% to 2.6% fat content.

2. The process of claim 1, wherein the meat has from 5–30% fat.

3. The process of claim 1, further comprising rapidly chilling the meat product, after removal from the centrifuge, to less than 35° F. to minimize spoilage and maintain functionality of the meat product.

4. The process of claim 3, further comprising chilling the meat product by means of a continuous heat exchanger to a temperature below 40° F.

5. The process of claim 4, wherein grinding the meat reduces the particle size to equal to or less than 0.060 inches in diameter.

6. The process of claim 5, further comprising storing the ground meat less than two hours after the grinding of the meat.

7. The process of claim 6, wherein heating the meat comprises using a continuous heating process to avoid bacterial growth possible with a batch process.

8. The process of claim 7, wherein heating the meat is by a continuous heat exchanger having water running through a heating jacket and the water is from 5° to 15° F. above the target temperature, thereby avoiding local overheating.

9. The process of claim 8, wherein the heat exchanger has an inlet and outlet to the heating jacket and water exiting the outlet is approximately 1°–2° F. less than the water entering the inlet.

10. The process of claim 1, wherein the meat is turkey or chicken.

11. The process of claim 1, further comprising applying a centrifugal force of at least 200 times the force of gravity.

12. The process of claim 1, wherein the pond depth is approximately equal to said distance.

13. The process of claim 1, wherein the centrifuge bowl and screw conveyor have a differential speed of from two to thirty RPM.

14. The process of claim 1, further comprising removing the oil product from the centrifuge.

* * * * *

UNITED STATES PATENT AND TRADEMARK OFFICE
CERTIFICATE OF CORRECTION

PATENT NO. : 5,650,187

DATED : July 22, 1997

INVENTOR(S) : Franklin et al.

It is certified that error appears in the above-identified patent and that said Letters Patent is hereby corrected as shown below:

Col. 3, line 53: "Just" should read --just--

Col. 6, line 61: "The MDT" does not start a new paragraph.

Col. 8, line 35: delete "P-3400 Centrifuge"

Col. 8, line 36: insert --P-3400 Centrifuge--

Col. 8, line 58: "Jacket" should read --jacket--

Col. 10, line 34: "14.7%" should read --18.4%--

Col. 11, line 41: "heating, samples" should read --heating. Samples--

Signed and Sealed this

Twentieth Day of January, 1998

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,650,187

DATED : July 22, 1997

INVENTOR(S) : Daniel L. Franklin et al

It is certified that error appears in the above-identified patent and that said Letters Patent is hereby corrected as shown below:

On the title page:

item [54], the title: insert --FAT-- after "LOW"

Column 1, line 1: insert --FAT-- after "LOW"

Signed and Sealed this

Thirteenth Day of October 1998

*Attest:*

BRUCE LEHMAN

*Attesting Officer*     Commissioner of Patents and Trademarks